United States Patent
Lehmayr et al.

(10) Patent No.: US 11,135,661 B2
(45) Date of Patent: Oct. 5, 2021

(54) METHOD FOR INTRODUCING A BALANCING MARK INTO THE COMPRESSOR WHEEL OF A TURBOCHARGER, AND TURBOCHARGER COMPRISING A COMPRESSOR WHEEL WHICH HAS A BALANCING MARK

(71) Applicant: Continental Automotive GmbH, Hannover (DE)

(72) Inventors: Bernhard Lehmayr, Regensburg (DE); Markus Graf, Pfatter (DE)

(73) Assignee: Vitesco Technologies GmbH, Hannover (DE)

( * ) Notice: Subject to any disclaimer, the term of this patent is extended or adjusted under 35 U.S.C. 154(b) by 599 days.

(21) Appl. No.: 15/766,418

(22) PCT Filed: Sep. 21, 2016

(86) PCT No.: PCT/EP2016/072386
§ 371 (c)(1),
(2) Date: Apr. 6, 2018

(87) PCT Pub. No.: WO2017/060086
PCT Pub. Date: Apr. 13, 2017

(65) Prior Publication Data
US 2018/0313366 A1 Nov. 1, 2018

(30) Foreign Application Priority Data
Oct. 7, 2015 (DE) .................... 10 2015 219 374.8

(51) Int. Cl.
*B23C 3/00* (2006.01)
*F01D 5/02* (2006.01)
(Continued)

(52) U.S. Cl.
CPC .................. *B23C 3/00* (2013.01); *B23C 3/18* (2013.01); *F01D 5/027* (2013.01); *F04D 29/284* (2013.01);
(Continued)

(58) Field of Classification Search
CPC ....... B23C 3/00; B23C 3/18; F05D 2250/193; F05D 2250/141; F05D 2250/16; F05D 2250/70
See application file for complete search history.

(56) References Cited

U.S. PATENT DOCUMENTS

| 2,079,717 A | * | 5/1937 | Roehm | ..................... B23C 3/18 409/193 |
| 7,955,047 B2 | * | 6/2011 | Spuler | ..................... F02C 6/12 415/144 |

(Continued)

FOREIGN PATENT DOCUMENTS

| CN | 101144394 A | 3/2008 |
| CN | 101965240 A | 2/2011 |

(Continued)

OTHER PUBLICATIONS

International Search Report and Written Opinion dated Dec. 13, 2016 from corresponding International Patent Application No. PCT/EP2016/072386.

(Continued)

*Primary Examiner* — Jason L Vaughan
*Assistant Examiner* — Amanda Kreiling

(57) ABSTRACT

The invention relates to a method for introducing a balancing mark into the compressor wheel of a turbocharger. According to the method, a milling tool is firstly moved in a first direction in order to introduce a recess into the compressor wheel, and the milling tool located in the recess then runs out in a second direction in order to convert the (Continued)

recess into a pear segment-shaped balancing mark. The invention furthermore relates to a turbocharger which comprises a compressor wheel that has one or more pear segment-shaped balancing marks.

9 Claims, 4 Drawing Sheets

(51) Int. Cl.
    *B23C 3/18*     (2006.01)
    *F04D 29/28*     (2006.01)
    *F02C 6/12*     (2006.01)
    *F04D 29/66*     (2006.01)

(52) U.S. Cl.
    CPC .............. *F02C 6/12* (2013.01); *F04D 29/662* (2013.01); *F05D 2220/40* (2013.01); *F05D 2230/10* (2013.01); *F05D 2240/20* (2013.01); *F05D 2250/141* (2013.01); *F05D 2250/16* (2013.01); *F05D 2250/193* (2013.01); *F05D 2250/70* (2013.01); *F05D 2260/15* (2013.01)

(56) References Cited

U.S. PATENT DOCUMENTS

| | | |
|---|---|---|
| 9,803,654 B2 | 10/2017 | Yagi et al. |
| 2009/0097969 A1 | 4/2009 | Spuler |
| 2011/0067240 A1 | 3/2011 | Prust et al. |
| 2011/0091324 A1 | 4/2011 | Holzschuh |
| 2015/0322793 A1 | 11/2015 | Takabatake et al. |

FOREIGN PATENT DOCUMENTS

| | | |
|---|---|---|
| CN | 102046960 A | 5/2011 |
| CN | 201945420 U | 8/2011 |
| CN | 104350255 A | 2/2015 |
| CN | 104487714 A | 4/2015 |
| CN | 204640204 U | 9/2015 |
| DE | 102008016937 A1 | 10/2009 |
| DE | 102010048099 A1 | 4/2012 |
| DE | 112013002879 T5 | 3/2015 |
| EP | 1900908 A2 | 3/2008 |
| FR | 2844877 A1 | 3/2004 |
| WO | 2009121465 A1 | 10/2009 |
| WO | 2012045397 A1 | 4/2012 |
| WO | 2014/008117 A1 | 1/2014 |
| WO | 2014/128930 A1 | 8/2014 |
| WO | 2015/132896 A1 | 9/2015 |

OTHER PUBLICATIONS

German Search Report dated Jun. 7, 2016 from corresponding German Patent Application No. 10 2015 219 374.8.
Chinese First Office Action dated Dec. 25, 2018 for the counterpart Chinese Patent Application No. 201680058726.8.
Chinese Second Office Action dated Sep. 4, 2019 for the counterpart Chinese Patent Application No. 201680058726.8.

* cited by examiner

METHOD FOR INTRODUCING A BALANCING MARK INTO THE COMPRESSOR WHEEL OF A TURBOCHARGER, AND TURBOCHARGER COMPRISING A COMPRESSOR WHEEL WHICH HAS A BALANCING MARK

BACKGROUND

The invention concerns a method for introducing a balancing mark into the compressor wheel of a turbocharger, and a turbocharger comprising a compressor wheel which has a balancing mark.

It is already known to balance the core assembly of an exhaust gas turbocharger. This is achieved for example in that material is removed on an accessible side of the compressor wheel by means of a milling tool. Since it must be ensured that the blades of the compressor wheel are not damaged during material removal, material is removed from the hub contour of the compressor wheel to the desired depth by a one-dimensional advance of milling tool. This procedure is not optimal in terms of flow dynamics or strength, nor in relation to space requirement. The space available for material removal is limited by the small spaces existing between adjacent blades of the compressor wheel. For aerodynamic reasons, enlarging this blade spacing is disadvantageous. Furthermore, a strength analysis performed after removal of material shows that a use of milling tools with greater tool radius and smaller removal depths indeed leads to lower stress peaks, but at the same time smaller quantities of material are removed.

DE 10 2008 016 937 A1 discloses an exhaust gas turbocharger for an internal combustion engine which has a through-flow housing and a rotor mounted rotatably in the housing. The rotor comprises a first and a second impeller. The first impeller is connected rotationally fixedly to the second impeller via a shaft. The first and/or the second impeller has a balancing mark which is positioned on the back of the corresponding impeller. The balancing mark has a radial balancing mark profile, and an outer edge and an inner edge. The radial balancing mark profile has a first tangential angle at the outer edge, and a second tangential angle at the inner edge. The value of the first tangential angle and/or the second tangential angle is less than 40°.

The invention is based on the object of providing an improved method for making a balancing mark in the compressor wheel of a turbocharger, and a turbocharger provided with such a balancing mark.

BRIEF SUMMARY

This object is achieved by a method in which a milling tool is firstly moved in a first direction on the compressor wheel in order to introduce a recess into the inflow side of the compressor wheel, and then the milling tool located in the recess runs out in a second direction in order to convert the recess into a pear segment-shaped balancing mark.

The advantages of this procedure lie in particular in that, by means of the claimed method, a greater quantity of material can be removed without increasing the space requirement and while only slightly influencing the strength of the supporting cross-sections of the compressor wheel base body. In particular, the invention allows a pear-segment shaped balancing mark to be made in the inflow side of the compressor wheel in one pass, i.e. without having to reapply the milling tool repeatedly. Such an application of a pear segment-shaped balancing mark in the inflow side of the compressor wheel furthermore brings the advantages of reduced production time and increased production accuracy.

BRIEF DESCRIPTION OF THE DRAWINGS

The invention is explained below as an example with reference to the figures. In the drawing.

DETAILED DESCRIPTION

Figure 1:
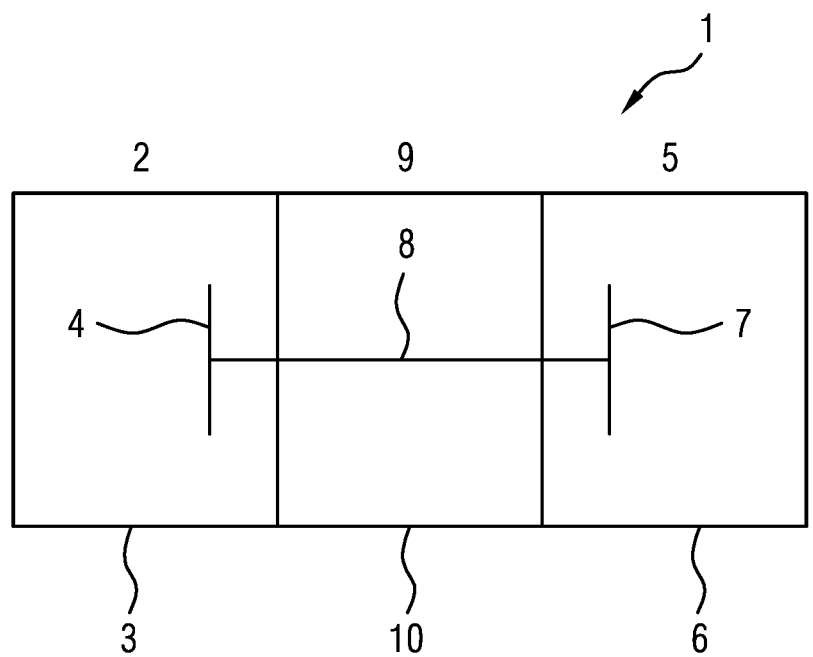
FIG. 1 is a block diagram illustrating the basic construction of an exhaust gas turbocharger 1.

FIG. 1 is a block diagram illustrating the basic construction of an exhaust gas turbocharger 1.

This exhaust gas turbocharger 1 has a turbine 2 which contains a turbine wheel 4 arranged in a turbine housing 3. The exhaust gas turbocharger 1 also has a compressor 5 which contains a compressor wheel 7 arranged in a compressor housing 6. The exhaust gas turbocharger 1 also has a bearing device 9 which contains a bearing housing 10 that is connected to the compressor housing 6 and the turbine housing 3. A shaft 8, at one end region of which there is the turbine wheel 4 and at the other end region there is the compressor wheel 7, is mounted in the bearing housing 10. In that context, the turbine wheel 4 and the compressor wheel 7 can be secured to the shaft 8 or be an integral constituent of the shaft 8.

During operation of the exhaust gas turbocharger, an exhaust gas stream of a motor vehicle, supplied to the exhaust gas turbocharger, drives the turbine wheel 4, thus turning the shaft 8 which is fixedly connected to the turbine wheel 4. This rotational movement is transferred to the compressor wheel 7, which is also fixedly connected to the shaft 8. Fresh air supplied to the compressor 5 is compressed by means of the compressor wheel 7; this air is supplied, together with the necessary fuel, to the combustion chambers of the engine of the motor vehicle in order to increase engine power.

Figure 2:
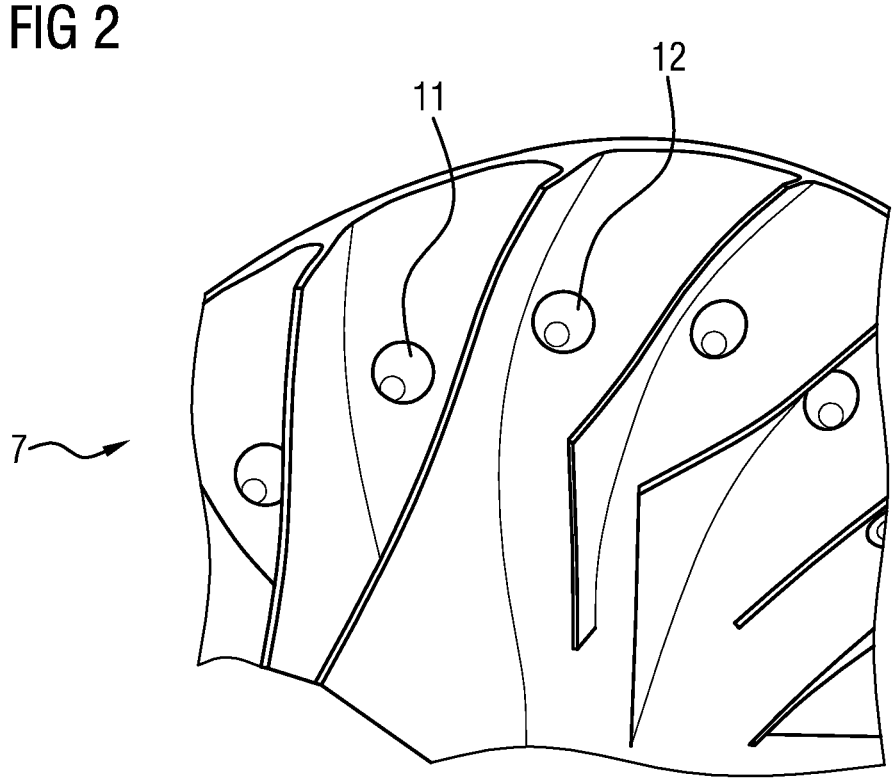
FIG. 2 is a perspective view of part of a compressor wheel with ball segment-shaped balancing marks.

FIG. 2 is a perspective view of part of a compressor wheel 7 with ball segment-shaped balancing marks 11 and 12. These balancing marks are made on the inflow side of the compressor wheel by moving a milling tool on the compressor wheel in one direction, i.e. one-dimensionally, in order then, after making contact with the compressor wheel, to make said ball segment-shaped recess of the desired depth in the compressor wheel.

Figure 3:
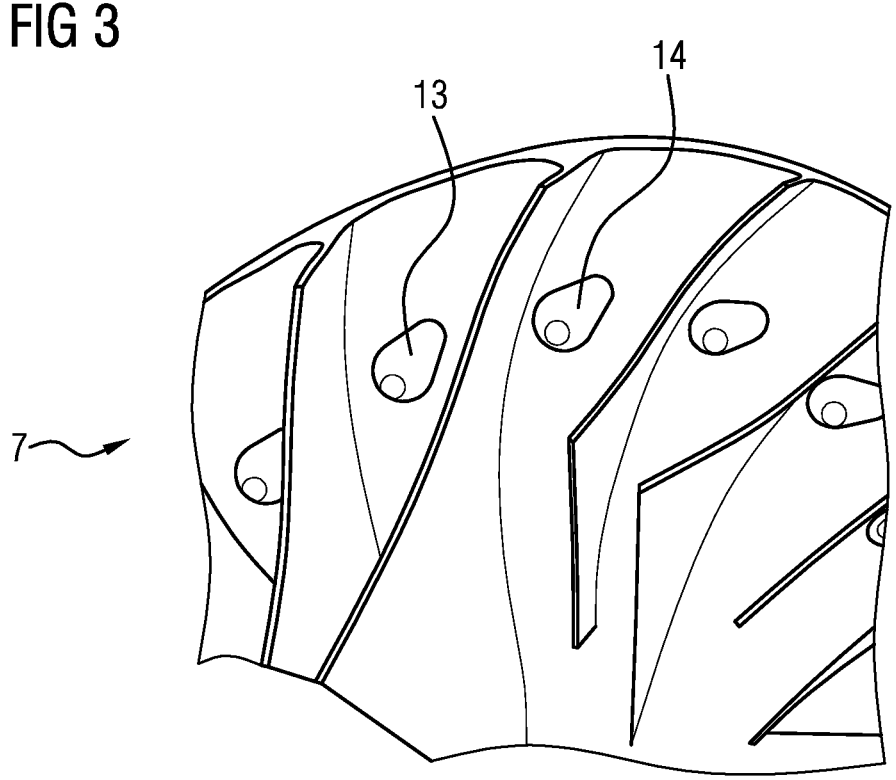
FIG. 3 is a perspective view of part of a compressor wheel with pear segment-shaped balancing marks.

FIG. 3 shows a perspective view of part of a compressor wheel 7 with pear segment-shaped balancing marks 13 and 14, as may be made in the compressor wheel using a method according to the invention. These balancing marks 13 and 14 are also made on the inflow side of the compressor wheel, which is formed curved, by a method which is explained below with reference to FIG. 5.

Figure 5:
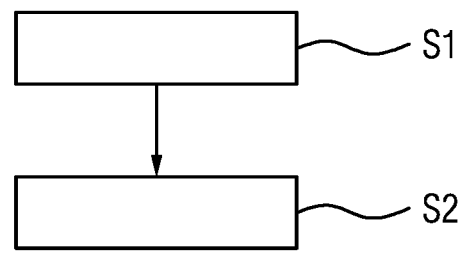
FIG. 5 is a flow diagram illustrating a method according to the invention.

This FIG. 5 shows that in a first step S1, firstly a ball segment-shaped recess is made in the curved inflow side of the compressor wheel 7 by moving a milling tool on the compressor wheel 7 in a first direction, i.e. one-dimensionally, in order then, after making contact with the compressor wheel 7, to make said ball segment-shaped recess in the compressor wheel 7. Then in a second step S2, the milling tool present in the ball segment-shaped recess is run out in a second direction in order to convert the respective ball segment-shaped recess into a pear segment-shaped recess, and thus create a pear segment-shaped balancing mark.

Then in the present invention, the milling tool is advanced two-dimensionally, in the sense that the milling tool is firstly moved on the compressor wheel in one direction in order to create a ball segment-shaped recess of desired depth, and then the milling tool positioned in the ball segment-shaped recess is deflected in a second direction and allowed to run out in this second direction, in order to create the final desired, generally pear segment-shaped recess which forms the desired pear segment-shaped balancing mark.

The milling tool is preferably deflected at an angle which corresponds approximately to the angle of the blades of the compressor wheel, so as to make optimum use of the constriction in the channel between adjacent blades. In addition, preferably the advance of the milling tool in the axial direction is stopped so that the supporting cross-section of the compressor wheel base body remains constant in the region of the entire pear segment-shaped recess. However, because of the use of the same milling tool as in the production of a known ball segment-shaped balancing mark of the same radius, which corresponds to the radius of the milling tool, the notch which results from the removal of material in the shape of a pear segment has less of a weakening effect since the notch has an elongate form. The volume of material removed when making a pear segment-shaped mark is greater than the volume removed when making a ball segment-shaped mark of corresponding depth. The space required for making a pear segment-shaped recess corresponds to the space required for making a ball segment-shaped recess.

In the exemplary embodiment described above, the recess made in the compressor wheel in the first method step is a ball segment-shaped recess. According to further embodiments not shown in the figures, this recess may also have a different shape, wherein the shape of the recess depends on the shape of the milling tool head. The resulting shape of the upper peripheral edge of the recess may then for example be circular, elliptical or parabolic.

Figure 6:
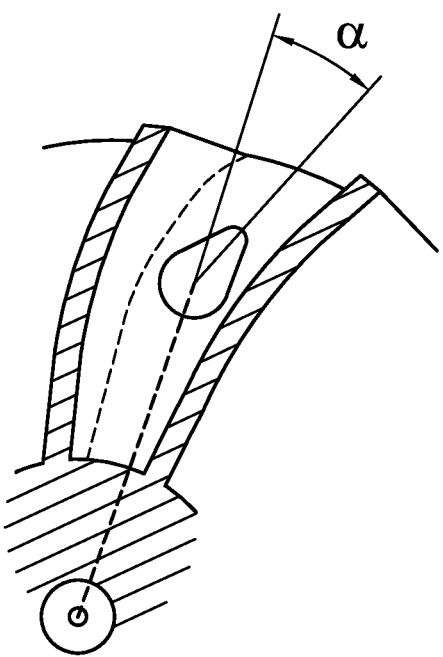
FIG. 6 is a sketch to illustrate angle α made by the pear segment-shaped balancing mark with a linear run-out of the milling tool.

The milling tool may run out in the second direction in rectilinear or arcuate fashion. A rectilinear run-out, which can easily be achieved, leads to the shape of the balancing mark illustrated in FIG. 3. FIG. 6 is a sketch to illustrate angle α made by the pear segment-shaped balancing mark with a linear run-out of the milling tool.

Figure 4:
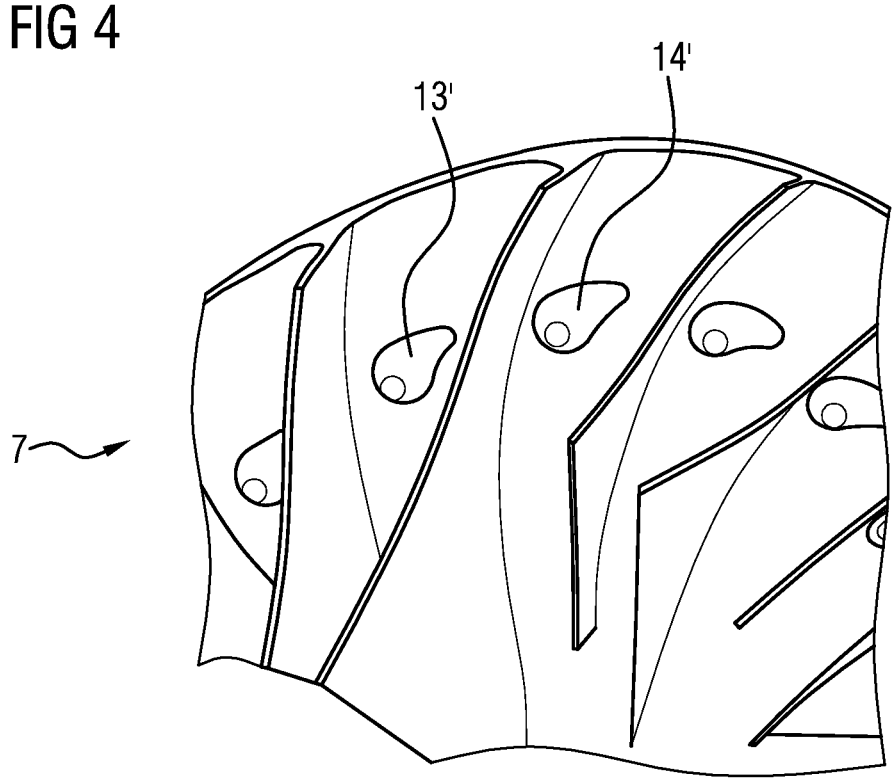
FIG. 4 is a perspective view of part of a compressor wheel with curved pear segment-shaped balancing marks.

With an arcuate run-out of the milling tool, the risk of damaging the blade wheel by the milling tool is reduced. Such an arcuate run-out of the milling tool finally gives a curved pear segment-shaped balancing mark. Such curved pear segment-shaped balancing marks 13' and 14' in a compressor wheel are illustrated in FIG. 4.

In one embodiment of the method according to the invention, the axial coordinates of the advance of the milling tool are held constant during the run-out. In this case, the supporting cross-section of the compressor wheel remains constant.

In another embodiment of the method according to the invention, the axial coordinates of the advance of the milling tool are changed during the run-out. In this case, it is possible to deliberately create different supporting cross-sections of the compressor wheel as required.

In principle, if a balancing mark is made at a larger radial distance from the longitudinal centre axis of the compressor wheel, the balancing mark is more effective. However, in general, the wall thickness of the compressor wheel is smaller at this greater distance from the longitudinal centre axis of the compressor wheel, so that making the balancing mark in this region of the compressor wheel can cause problems with regard to the strength of the compressor wheel.

When a balancing mark is made at a smaller radial distance from the longitudinal centre axis of the compressor wheel, although the wall thickness of the compressor wheel is greater, there is little space between the blades of the compressor wheel. Consequently, the possible removal quantity is increased because of the greater wall thickness there, but reduced because of the limited space.

A method according to the invention however brings the advantage that, when a balancing mark is made at a greater distance from the longitudinal centre axis of the compressor wheel, larger quantities of material can be removed without the need for deeper boring.

As a comparison of FIGS. 2, 3 and 4 shows, when a pear segment-shaped balancing mark is made, the radially inner edge of the balancing mark remains unchanged in comparison with that of a ball segment-shaped balancing mark, while the radially outer edge of a pear segment-shaped balancing mark has a different contour from that of a ball segment-shaped balancing mark.

Figure 7:
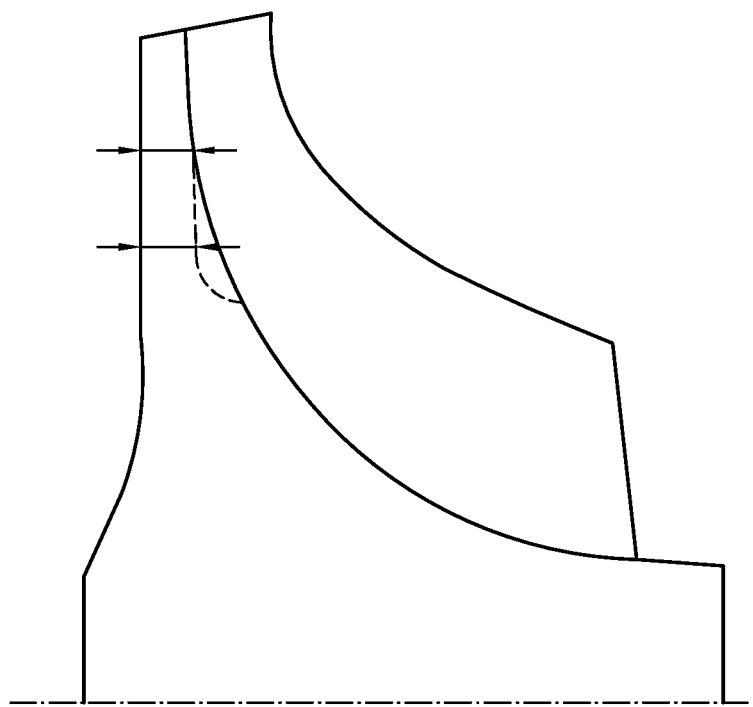
FIG. 7 is a sketch to illustrate a side view of a compressor wheel provided with a pear segment-shaped balancing mark.

FIG. 7 is a sketch to illustrate a side view of a compressor wheel provided with a pear segment-shaped balancing mark. This depiction shows in particular that when a pear segment-shaped balancing mark is made, as indicated by a dashed line, the supporting cross-section of the compressor wheel is retained.

Figure 8:
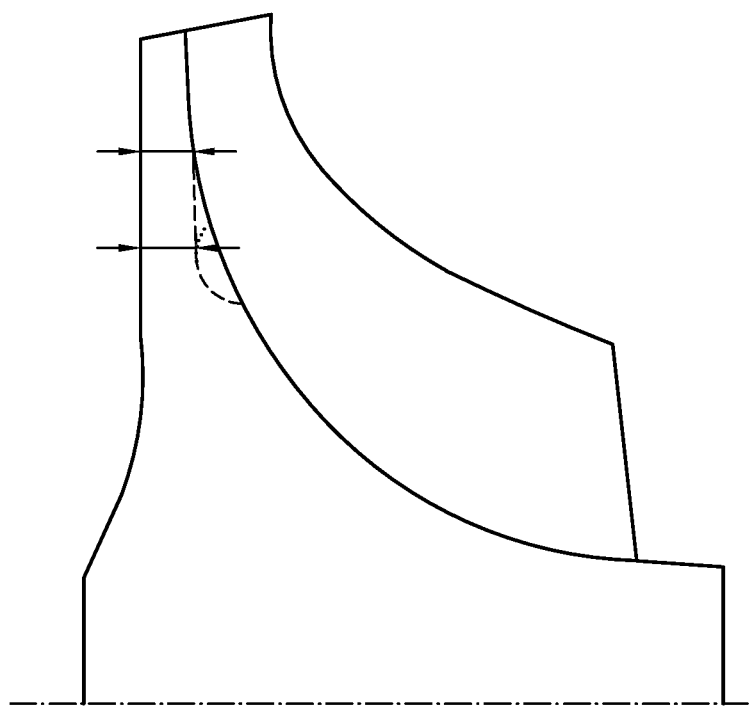
FIG. 8 is a sketch to illustrate a side view of a compressor wheel provided with a pear segment-shaped balancing mark in comparison with a ball segment-shaped balancing mark.

FIG. 8 is a sketch to illustrate a side view of a compressor wheel provided with a pear segment-shaped balancing mark in comparison with a ball segment-shaped balancing mark. This depiction shows in particular that when a pear segment-shaped balancing mark is made, in comparison with a ball segment-shaped balancing mark as indicated by the dotted line, there is no reduction in the supporting cross-section of the compressor wheel.

The invention claimed is:

1. A method for introducing a balancing mark into a compressor wheel of a turbocharger, the method comprising:
    moving a milling tool in a first direction in order to make a recess in an inflow side of the compressor wheel, the recess positioned between a first blade and a second blade of the compressor wheel, and
    then running out the milling tool situated in the recess in a second direction in order to convert the recess into a pear segment-shaped balancing mark,
    wherein the milling tool is run out at an angle corresponding to the angle of the first and second blades of the compressor wheel.

2. The method as claimed in claim 1, wherein the recess made in the inflow side of the compressor wheel includes an upper edge configured so as to be circular, elliptical or parabolic.

3. The method as claimed in claim 1, wherein the recess is formed in the shape of a ball segment.

4. The method as claimed in claim 1, wherein the recess is made in a curved surface of the inflow side of the compressor wheel.

5. The method as claimed in claim 1, wherein the milling tool run-out is rectilinear.

6. The method as claimed in claim 1, wherein the milling tool run-out is arcuate.

7. The method as claimed in claim 6, wherein the arcuate run-out of the milling tool is adapted to a curvature of blades of the compressor wheel.

8. The method as claimed in claim 1, wherein axial coordinates of a movement of the milling tool are held constant during the run-out.

9. The method as claimed claim 1, wherein axial coordinates of a movement of the milling tool are changed during the run-out.

\* \* \* \* \*